(12) United States Patent
Ballester et al.

(10) Patent No.: US 7,426,666 B2
(45) Date of Patent: Sep. 16, 2008

(54) NOISY CHANNEL EMULATOR FOR HIGH SPEED DATA

(75) Inventors: Raul Benet Ballester, Premia de Mar (ES); Adriaan J. De Lind Van Wijngaarden, New Providence, NJ (US); Ralf Dohmen, VS-Villingen (DE); Bernd Dotterweich, Hirschaid (DE); Swen Wunderlich, Dresden (DE)

(73) Assignee: Lucent Technologies Inc., Murray Hill, NJ (US)

( * ) Notice: Subject to any disclaimer, the term of this patent is extended or adjusted under 35 U.S.C. 154(b) by 777 days.

(21) Appl. No.: 10/848,496

(22) Filed: May 18, 2004

(65) Prior Publication Data

US 2005/0262402 A1  Nov. 24, 2005

(51) Int. Cl.
*G01R 31/28* (2006.01)
(52) U.S. Cl. .............. 714/728; 714/705; 714/738; 708/250; 708/256; 700/78
(58) Field of Classification Search .............. 714/703, 714/728, 705; 708/256; 700/78
See application file for complete search history.

(56) References Cited

U.S. PATENT DOCUMENTS

| | | | | |
|---|---|---|---|---|
| 3,986,168 | A * | 10/1976 | Anderson | 714/739 |
| 4,493,046 | A * | 1/1985 | Watanabe | 708/252 |
| 4,571,546 | A * | 2/1986 | Wilkinson | 327/164 |
| 5,046,036 | A * | 9/1991 | Tezuka | 708/253 |
| 5,802,105 | A * | 9/1998 | Tiedemann et al. | 375/225 |
| 5,872,790 | A |  2/1999 | Dixon | |
| 5,910,907 | A * | 6/1999 | Chen et al. | 708/313 |
| 6,192,385 | B1 * | 2/2001 | Shimada | 708/250 |
| 7,263,540 | B1 * | 8/2007 | Kuehnel | 708/256 |
| 2001/0050824 | A1 * | 12/2001 | Buch | 360/48 |
| 2004/0034820 | A1 * | 2/2004 | Soltis et al. | 714/47 |

(Continued)

FOREIGN PATENT DOCUMENTS

EP   1100198 A2 *  5/2001

OTHER PUBLICATIONS

Lee et. al., A Hardware Gaussian Noise Generator for Channel Code Evaluation, 2003, 11th Annual IEEE Symposium of Field-Programmable Custom Computing Machines (ECCM 2003), pp. 1-10.*

(Continued)

*Primary Examiner*—Mujtaba K. Chaudry

(57) ABSTRACT

Bit error patterns for high speed data systems are generated by randomly distributing a first error pattern of G bits, output from a group of substantially uncorrelated bit error generators, into a second error pattern of N bits, where G and N are integers and G is less than or equal to N. In one embodiment, G bit error generators produce a G bit error pattern per bit period. Each bit error generator operates at a prescribed bit error rate. A distribution element randomly rearranges the order and placement of the G bits produced during a single bit period within an N bit grouping. The N bit group corresponds to N consecutive bits of data with which the error bits can be combined. Each bit error generator can be realized by a linear feedback shift register or its equivalent. Different primitive polynomials and different lengths can be used for each linear feedback shift register. In addition, outputs from fewer than all the shift register stages are utilized to generate each error bit.

17 Claims, 1 Drawing Sheet

U.S. PATENT DOCUMENTS

2004/0048653 A1* 3/2004 Lefebvre et al. ............... 463/22
2004/0096060 A1* 5/2004 Henry et al. .................. 380/46
2004/0193994 A1* 9/2004 Roy et al. .................... 714/746

OTHER PUBLICATIONS

Com Block, com-1023 Bit Error Rate Generator Additive White Gaussian Noise Generator, download com 1023.pdf Apr. 13, 2004.

Xilinx Logicore, Linear Feedback Shift Register v3.0, DS257(v1.0) Mar. 28, 2003, pp. 1-19.

Xilinx System Generator User Guide, White Gaussian Noise Generator (Communication), downloaded Apr. 16, 2004, pp. 1-2.

Xilinx LFSRs as Functional Blocks in Wireless Applications, S. Lim and A. Miller, XAPP220 (v1.1) Jan. 11, 2001, pp. 1-10.

* cited by examiner

NOISY CHANNEL EMULATOR FOR HIGH SPEED DATA

BACKGROUND OF THE INVENTION

1. Field of the Invention

This invention relates to a method and apparatus for generating a bit error sequence and, more particularly, for emulating a noisy data channel.

2. Description of the Related Art

Bit errors are common in all types of data communication systems. They occur as a result of noise in the transmission medium, channel degradation, and other forms of signal interference. The rate at which bit errors occur during a prescribed length bit sequence is known as the bit error rate, a measure that reflects the quality of the transmission medium. Deterioration in the quality of the transmission medium generally leads to an increase in the bit error rate.

Not only can the bit error rate be quantified, but the underlying bit errors that give rise to the error rate can be emulated. In most cases, the bit errors occur randomly. Hardware and software error pattern generators can be made to follow a particular type of random error distribution. Bit error rates can also be varied by changing some parameters of the emulation. As a result, system design concepts and requirements can be tested in an appropriately simulated noisy environment without actually building the system thereby saving considerable expense.

SUMMARY OF THE INVENTION

Bit error patterns for high speed data systems are generated in accordance with the principles of the present invention by randomly distributing a first error pattern of G bits, output from a group of substantially uncorrelated bit error generators, into a second error pattern of N bits, where G and N are integers and G is less than or equal to N.

In an example from experimental practice, G bit error generators produce a G bit error pattern per bit period. Each bit error generator operates at a prescribed bit error rate. A distribution element randomly rearranges the order and placement of the G bits produced during a single bit period within an N bit group. The N bit group corresponds to N consecutive bits of data with which the error bits can be combined.

Each bit error generator can be realized by a linear feedback shift register or its equivalent. Different primitive polynomials and different lengths can be used for each linear feedback shift register. In addition, outputs from fewer than all the shift register stages can be utilized to determine when to generate an error bit.

BRIEF DESCRIPTION OF THE DRAWINGS

A more complete understanding of the invention may be obtained by reading the following description of specific illustrative embodiments of the invention in conjunction with the appended drawings in which.

Figure 1:
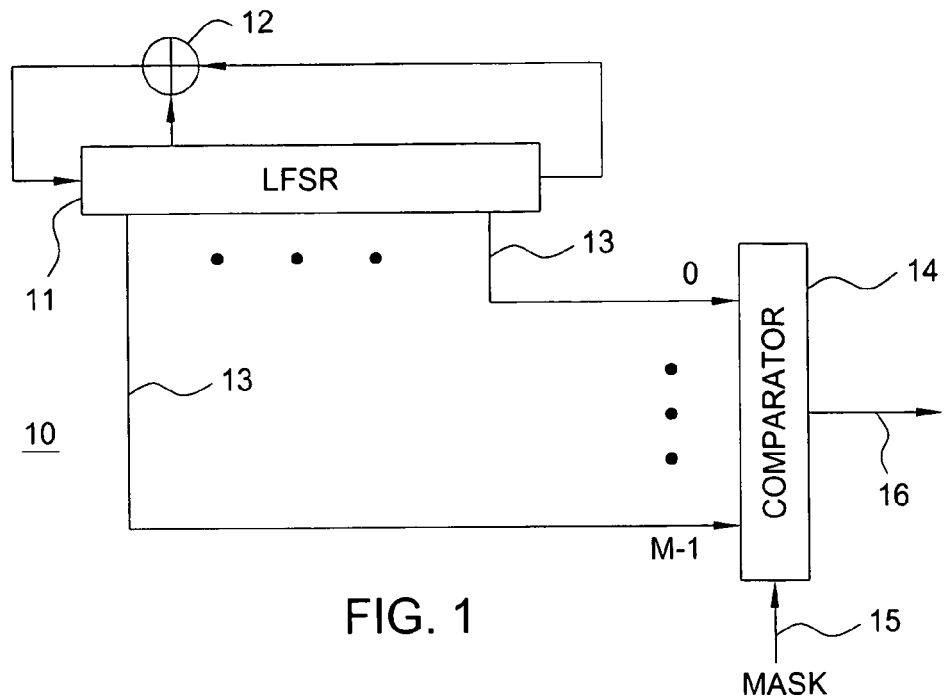
FIG. 1 shows a simplified block diagram of a single bit error generator utilized in accordance with the principles of the present invention to realize the arrangement shown in FIG. 2.

It is to be noted, however, that the appended drawings illustrate only typical embodiments of this invention and are therefore not to be considered limiting of its scope, for the invention may admit to other equally effective embodiments. Where possible, identical reference numerals have been inserted in the figures to denote identical elements.

DETAILED DESCRIPTION

Fixed and random pattern bit error generators can be realized with storage elements such as random access memories configured from an external device. The storage element stores the sequence of bits forming the error pattern. The error pattern can be a repetitive bit pattern that has random or pseudo-random properties. Error patterns can be generated by a linear feedback shift register of any particular length and stored in the storage element for subsequent readout, one bit per bit clock cycle. After all bits in an error pattern sequence have been read out of the storage element, the readout can be restarted from the beginning of the sequence.

While the approach described above permits the generation of an error bit sequence, it is limited in that the distribution of errors behaves more deterministically than a real communication environment. Moreover, the error bit pattern must be regenerated and written to the storage device in the event that one wants to change the bit error rate.

In the present invention, the bit error rate can be easily changed while the error generator behaves more similarly to the well known binary symmetric channel where the probability of error is substantially the same for all bits and all possible line symbols. Most communication channels are too complex to be modeled by the binary symmetric channel, but measurements indicate that the model works well for optical communication channels.

In many optical communication channels, a receiver makes a hard decision about the data before any decoding takes place. If the noise is below a certain threshold or limit, it is effectively cancelled by the hard decision in the detector. But when the noise exceeds that limit, errors can occur in the detector's hard decision process. Binary ones can become zeroes and binary zeroes can become ones. As a result, this channel can be modeled as a binary symmetric. channel where the bit error rate, p, is the probability that a bit input to the channel will emerge from the channel in the opposite state (i.e., $0 \to 1$ or $1 \to 0$).

The present invention utilizes a plurality of bit error generators that are each based on a linear feedback shift register design as shown in FIG. 1. Bit error generator 10 shown in FIG. 1 includes a linear feedback shift register (LFSR) sequence generator of length M whose individual stages are output in parallel to a comparator 14. During each bit period, comparator 14 responds to the M bits from linear feedback shift register 11 together with a "mask" signal on lead 15 to generate one error bit of the bit error sequence.

Linear feedback shift register 11 is an M-stage device that is well known in the art for generating pseudorandom bit sequences. LFSR 11 is realized as a maximum length sequence generator. Properties of maximum length sequences and their generation are well known in the art. Programmable LFSRs suitable for use in the present invention have been realized in hardware and software and permit variation of the form, the primitive polynomial, and the maximum length. One such exemplary programmable LFSR that is commercially available from Xilinx is described in Product Specification DS257 (v1.0). It is understood that LFSRs require an initialization to other than an all zero condition so that they can generate their pseudorandom sequences. For example, a lock-up detection mechanism can be added to LFSR 11 without changing the other operational properties of the device. Lock-up detection is employed to detect an all-zeroes state of the LFSR and, when such a state is detected, inject a "1" into the feedback path of the LFSR.

LFSR 11 is designed with M consecutive storage elements and provides feedback from one end to the other as shown. Typically, the feedback path includes one or more exclusive-OR gates 12 also shown in FIG. 1 based on the particular form of LFSR chosen, that is, Galois or Fibonacci. The configuration of the feedback including designation of which stages are tapped for input to the exclusive-OR gate is specified by a primitive polynomial also known as a generator polynomial. Taps for each stage are determined by the coefficients of the polynomial and the form of the LFSR such as a Galois or a Fibonacci form. While the LFSR generates a maximum length bit sequence at its output, the M-bit pattern within the M shift register stages changes for each bit output by the LFSR. It is that M-bit pattern from the shift register stages within LFSR 11 that is used as an input to comparator 14. The M-bit pattern is represented by leads 0 through M−1 in FIG. 1.

Pseudo-random number generators such as LFSR 11 are generally started by loading the shift register with a "seed". The seed is a random or deterministic, non-zero bit pattern that has a length equal to the shift register length. By starting sequence generation with a particular seed, it is possible to reproduce a sequence in the same order for a particular simulation or test. While deterministic seeds are useful for reproducing certain test error environments, it is understood by those persons skilled in the art that random seeds may also be desirable. Random seeds can be realized by digitizing the output of a random noise source such as a diode, or by generating the seed on a separate device such as a computer. The random seed can then be used to initialize the shift registers in the noisy channel emulator.

LFSR 11 can be adapted to generate its own random seed and insert that seed into the shift register stages. In addition, LFSR 11 includes at least one port for inputting an externally supplied random seed to the shift register stages. The port can also serve as an output port from which the contents of the stages can be read. This feature can be implemented as a read/write port to the shift register stages. Reading the shift register stage contents may be desirable at the end of a testing sequence so that testing can be resumed later from the point at which it was terminated.

Comparator 14 also receives a signal on lead 15 designated as a mask signal. The purpose of this signal is to provide a masking function to selected comparator input bits from LFSR 11. In experimental practice, comparator 14 determines whether the L bits within the M-bit pattern from LFSR 11 are in the same state, for example, all ones. Integer L is greater than zero but less than M. The mask signal provides sufficient information to mask the remaining M−L bit positions in the M-bit pattern so that they all appear in the same state, preferably an all ones pattern. When the L unmasked bits from LFSR 11 and the M−L masked bits are compared in comparator 14 during each successive bit period, an output error sequence is output on lead 16. Errors usually designated by the occurrence of a logical one in the output error sequence are output when the L bits and the M−L masked bit positions are all in the same state, generally a logical one. The choice of L (or conversely M−L), both with respect to its size and the location of the unmasked (or masked) bit positions in the M-bit pattern from LFSR 11 increases the stochastic nature of the output error sequence.

The mask signal on lead 15 is selected to affect M−L bit positions from the M-bit pattern. The M−L bit positions can be chosen at random and need not obey any particular rules limiting the number of consecutive bit positions being masked. Masking is a well known function and can be realized by, for example, inputting the mask signal and the M−L bit positions from LFSR 11 into logical OR gates within comparator 14 so that the gate output is held to a logical one when the mask signal (e.g., logical one) is applied thereto. In this example, the L unmasked bits from the M-bit pattern and the M−L masked bits (output from the exemplary gates) are checked to see whether they are all in the same state in order to generate the output error sequence.

It should be understood by those persons skilled in the art that masking causes the M−L masked bits to be effectively exempt or excluded from comparison with the unmasked L bits. The value of integer L is selected to achieve a certain bit error rate in the output error sequence on lead 16. The bit error rate for the error generator described in FIG. 1 is $2^{-L}$. It is possible to vary the bit error rate therefore by varying the value of integer L.

Figure 2:
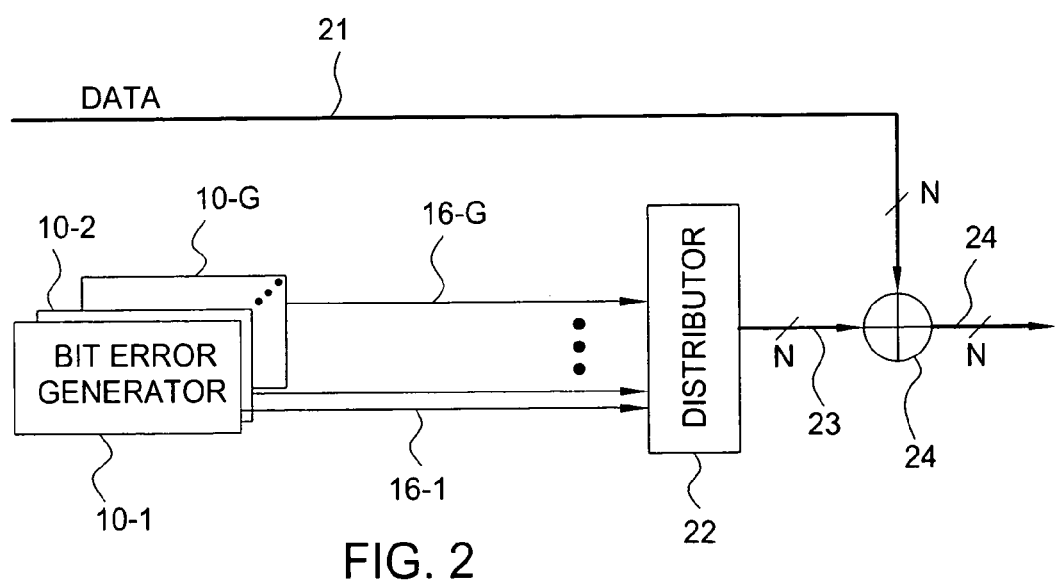
FIG. 2 shows a simplified block diagram of the complete noisy channel emulator realized in accordance with the principles of the present invention.

FIG. 2 shows a simplified block diagram representation of the noisy channel emulator realized in accordance with the principles of the present invention. The emulator utilizes a plurality of bit error generators 10-1 through 10-G described in reference to FIG. 1 above. Each of the G bit error generators outputs their respective bit error sequence on a corresponding lead 16-1 through 16-G. A mask signal (not shown in FIG. 2) is supplied to each bit error generator. It is contemplated that the same mask signal can be provided to all the bit error generators and, in the alternative, different mask signals can be provided to the bit error generators.

From experimental practice, it has been determined that the bit error generators should not be the same in order to further decorrelate the G output error sequences. One technique to provide different bit error generators is to select a different length M for each LFSR in the G bit error generators. Another technique is to utilize different primitive polynomials of the same order M. This leads to LFSRs having the same number of stages but different tap feedback configurations. It should be noted that, for ease of fabrication, the integer L within the each bit error generator is selected to be the same. That is, each of the G bit error generators produces a substantially identical bit error rate. It is contemplated that each of the bit error generators can produce a different bit error rate by employing different values for integer L. This latter arrangement would produce a somewhat more complex configuration in which the overall bit error rate is an average of all the different bit error rates for the G generators.

In operation, the G bit error generators output one bit for each of their error sequences during each consecutive bit period. The G bits, one on each of leads 16-1 through 16-G are input as a G-bit pattern to data distributor 22. Data distributor 22 scrambles the input G-bit pattern into an N-bit pattern that is output on lead 23. In this example, G is chosen to be less than or equal to N. It should be noted that integer N corresponds to the number of data bits present on lead 21 during a single bit period or timestamp period. In one example from experimental practice, the N bits during a single bit period on lead 21 are presented in parallel similar to a parallel bus arrangement.

Data distributor 22 can be realized as a space switch or multiplexer. Generally, the switching pattern employed by data distributor 22 is changed from one bit period to the next. When G is less than N, data distributor fills the remaining N−G bit positions in the output sequence on lead 23 with a bit indicative of a non-error, for example, a logical zero. The N-bit pattern output in successive bit periods comprises the error sequence for a noisy data communication channel. The N-bit error pattern on lead 23 is then combined with the N-bit data pattern on lead 21 on a bit-by-bit basis in exclusive-OR 24. That is, errors are made to appear in the N data bits by combining one data bit with the corresponding bit in the N-bit error pattern during that bit period.

When G error generators are used to create an error bit with error probability p and the binary vector is augmented with N−G non-error bits in data distributor 22, the maximum number of error bits in the block of N bits is G bits. In theory, the probability of observing G errors in N bits transmitted over a binary symmetric channel with bit error probability p is determined as follows:

$$Prob(G \text{ errors in } N \text{ bits}) = \frac{N!}{G!(N-G)!} \cdot p^G \cdot (1-p)^{N-G}$$

This relationship implies that the value of G should be chosen such that the probability of occurrence for greater than G errors is relatively small, for example, on the order of $10^{-30}$ depending on the particular application.

In the noisy channel emulator shown in FIG. 2, the bit error rate is given as $G/(N \times 2^L)$. The distribution of errors from the emulator is the same for all bit positions and for all symbols whether a logical one or a logical zero. The bit error rate is readily adjustable by changing the value of L or G or both. This error emulation technique provides a simple and effective apparatus for testing systems or system concepts without necessarily constructing the entire system or that are hard to realize in a real system such as high bit error rate environments without losing symbol synchronization. The bit error generator can also be used for on-chip fault diagnosis, both in production and post-production, or during repair tests.

In the exemplary embodiment described above, it was explained that the unmasked L bits were checked to see whether they were in the same state, for example, an all ones state, in order to generate an error. It should be apparent to persons skilled in the art that the unmasked L bits could also be checked against a predetermined L bit pattern. In such a modification the L bits from LFSR 11 may not be in the same state when an error bit is generated, but they can match the predetermined L bit pattern.

It is further contemplated that the operation of comparator 14 can be modified to be a threshold comparator. That is, comparator 14 can determine whether the number of unmasked bits from LFSR 11 that are in a particular state (e.g., 1 or 0) is greater than a threshold value T. When the threshold is exceeded, an error bit is generated. In this way, it is possible to utilize the error generator to create a wider range of bit error rates. It is also contemplated that the threshold comparator may recognize the input bits from the bit error generator as a number rather than a bit pattern that can be compared against the threshold T. For example, when the bit pattern from the LFSR 11 is 00011111 and T is set to 32, the bit pattern is recognized as a value of 31 which is less than the threshold value. In practice, the comparison against the threshold that causes the comparator to output an error bit can be a greater than comparison, a less than comparison, a greater than or equal to comparison, or a less than or equal to comparison. In addition, multiple thresholds can be employed and different numbers of error bits can be output during a single bit period based upon which threshold has been crossed. For example, if the exemplary threshold comparator has two thresholds T1 and T2 where T1 is less than T2, the comparator may output two error bits during a single bit period when the value of the bit pattern from LFSR 11 is between T1 and T2 and it may output one error bit during the bit period when the output is less than T1. Other obvious modifications of this exemplary alternative embodiment are contemplated.

While the foregoing is directed to embodiments of the present invention, other and further embodiments of the invention may be devised without departing from the basic scope thereof, and the scope thereof is determined by the claims that follow. It is understood that the G LFSRs may be advanced by one or more than one position (cycle) from one error bit to the next. In other words, it is contemplated that non-consecutive LFSR states may be used to generate consecutive bit positions in the error sequence.

Tradeoffs can be made in realizing the emulator. When the bit error rate is very low (e.g., $10^{-15}$), the time to measure errors is very long thereby implying a need for long shift registers in each LFSR. But this can be balanced by choosing a smaller value for G. Conversely, when the bit error rate is high (e.g., $10^{-4}$), there is a need for a higher value of G. Since, in the latter case, the time to measure errors is very short, it is possible to use shorter length LFSRs. This can be used to save hardware by concatenating LFSRs to increase the LFSR length and obtain a low bit error rate. If these same LFSRs are run separately, it is possible to obtain a high bit error rate.

The invention claimed is:

1. An apparatus for emulating a noisy data communication channel comprising:

G bit error generators, each bit error generator decorrelated from each other bit error generator, each bit error generator producing a pseudorandom bit error sequence; and a data distribution element responsive to the G pseudorandom bit error sequences for randomly rearranging each of G bits received from the G bit error generators during a single bit period into an N bit group;

wherein G and N are integers, and G is greater than 1 and less than or equal to N, wherein the N bit group corresponds to N consecutive bits of data with which the G error bits are combined.

2. The apparatus as defined in claim 1 wherein each bit error generator comprises, a maximum length linear feedback shift register defined by a primitive polynomial having M storage element stages, where M is an integer greater than 1;

a comparator element responsive to outputs from at least L storage element stages during each single bit period to generate the pseudorandom bit error sequence including a bit error in the single bit period when the at least L stage outputs correspond to a predetermined bit pattern during said bit period, where L is an integer greater than zero but less than M.

3. The apparatus as defined in claim 2 wherein the predetermined bit pattern is a pattern of bits all having the same logical value.

4. The apparatus as defined in claim 2 wherein the maximum length linear feedback shift register in each bit error generator has a different number of stages M from the maximum length linear feedback shift register in each other bit error generator.

5. The apparatus as defined in claim 2 wherein the maximum length linear feedback shift register in each bit error generator is defined by a different primitive polynomial from other maximum length linear feedback shift registers in each other bit error generator.

6. The apparatus as defined in claim 4 wherein the maximum length linear feedback shift register in each bit error generator is defined by a different primitive polynomial from other maximum length linear feedback shift registers in each other bit error generator.

7. The apparatus as defined in claim 1 wherein each bit error generator comprises, a maximum length liner feedback shift register defined by a primitive polynomial having M storage element stages, M is an integer greater than 1;

a comparator element jointly responsive to a mask signal and to M outputs from the M storage element stages during each single bit period to generate the pseudorandom bit error sequence, said comparator element also for combining said mask signal with outputs from M−L of said M storage element stages defined by said mask signal to generate M−L masked outputs having a first logical value, said pseudorandom bit error sequence including a bit error in the single bit period when the M−L masked outputs have the same logical value as each L output remaining from the M outputs, where L is an integer greater than zero but less than M.

8. The apparatus as defined in claim 7 wherein the maximum length liner feedback shift register in each bit error generator has a different number of stages M from the maximum length linear feedback shift register in each other bit error generator.

9. The apparatus as defined in claim 7 wherein the maximum length linear feedback shift register in each bit error generator is defined by a different primitive polynomial from other maximum length liner feedback shift registers in each other bit error generator.

10. The apparatus as defined in claim 8 wherein the maximum length linear feedback shift register in each bit error generator is defined by a different primitive polynomial from other maximum length linear feedback shift registers in each other bit error generator.

11. The apparatus as defined in claim 1 further including means for initializing at least one of said G bit error generators to a predetermined initial state.

12. The apparatus as defined in claim 2 further including means for initializing the maximum length linear feedback shift register in at least one of said G bit error generators to an initial state by storing a random seed in the M storage element stages.

13. The apparatus as defined in claim 11 wherein the means for initializing further includes means for supplying a final internal state of the at least one of said G bit error generators to an external output port.

14. The apparatus as defined in claim 12 wherein the means for initializing the maximum length liner feedback shift register further includes means for supplying a final internal state of the maximum length linear feedback shift register in the at least one of said G bit error generators to an external output port.

15. The apparatus as defined in claim 1 wherein said N bit group comprises the G bits from the G bit error generators and N−G bits having each representing a non-error bit condition.

16. The apparatus as defined in claim 2 wherein said comparator element includes at least a first predetermined threshold, said comparator element for comparing a value represented by said outputs from the at least L storage element stages to the at least first predetermined threshold and, when said value crosses said threshold, said comparator for generating at least one bit error during said bit period.

17. The apparatus as defined in claim 16 wherein the comparator element includes at least first and second thresholds, said first threshold being less than said second threshold, said comparator element for generating a multiple bit error when said value is between said first and second thresholds, and said comparator element for generating a single bit error when said value is less than said first threshold.

* * * * *